United States Patent
Balogh et al.

(10) Patent No.: US 12,005,975 B2
(45) Date of Patent: Jun. 11, 2024

(54) METHOD FOR PROVIDING STEERING ASSISTANCE FOR AN ELECTROMECHANICAL STEERING SYSTEM OF A MOTOR VEHICLE COMPRISING A REDUNDANTLY DESIGNED CONTROL DEVICE

(71) Applicants: thyssenkrupp Presta AG, Eschen (LI); thyssenkrupp AG, Essen (DE)

(72) Inventors: Andras Balogh, Tordas (HU); Gergely Horvath, Fülöpszállás (HU); Tamas Varga, Budapest (HU); Gergely Pinter, Budapest (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 974 days.

(21) Appl. No.: 16/967,476

(22) PCT Filed: Feb. 7, 2019

(86) PCT No.: PCT/EP2019/052988
§ 371 (c)(1),
(2) Date: Aug. 5, 2020

(87) PCT Pub. No.: WO2019/154903
PCT Pub. Date: Aug. 15, 2019

(65) Prior Publication Data
US 2021/0206427 A1 Jul. 8, 2021

(30) Foreign Application Priority Data
Feb. 12, 2018 (DE) ...................... 10 2018 103 082.7

(51) Int. Cl.
*B62D 5/04* (2006.01)

(52) U.S. Cl.
CPC ......... *B62D 5/0484* (2013.01); *B62D 5/0463* (2013.01); *B62D 5/0403* (2013.01); *B62D 5/049* (2013.01)

(58) Field of Classification Search
CPC .. B62D 5/0484; B62D 5/0463; B62D 5/0403; B62D 5/049; B62H 25/14; B60G 2800/06
See application file for complete search history.

(56) References Cited

U.S. PATENT DOCUMENTS

| 5,504,679 A | * | 4/1996 | Wada | B62D 5/0493 701/41 |
| 2011/0163708 A1 | * | 7/2011 | Mukai | B62D 5/046 318/722 |

(Continued)

FOREIGN PATENT DOCUMENTS

| CN | 102574543 A | 7/2012 |
| CN | 103303361 A | 9/2013 |

(Continued)

OTHER PUBLICATIONS

English Translation of International Search Report issued in PCT/EP2019/052988, dated May 16, 2019.

*Primary Examiner* — Behrang Badii
*Assistant Examiner* — Jay Khandpur
(74) *Attorney, Agent, or Firm* — thyssenkrupp North America, LLC

(57) ABSTRACT

Methods for providing steering assistance for an electromechanical steering system having a redundant control unit with a primary and a secondary control path. Respective primary and secondary control paths each have a computing unit, gate driver module, and power module. The method includes detecting an applied steering torque; calculating a primary and secondary motor target torque in the primary computing unit as a function of the applied steering torque; transmitting the primary motor target torque to a primary (Continued)

motor controller of the primary computing unit; determining primary motor currents to operate a primary electric motor or a primary winding group of the electric motor in the primary motor controller; transferring the secondary motor target torque from the primary computing unit to a secondary motor controller and determining secondary motor currents for operation of a secondary electric motor or a secondary winding group of the electric motor.

12 Claims, 1 Drawing Sheet

(56) References Cited

U.S. PATENT DOCUMENTS

| | | | |
|---|---|---|---|
| 2012/0136540 A1 | 5/2012 | Miller | |
| 2013/0233638 A1 | 9/2013 | Lee | |
| 2014/0257639 A1 | 9/2014 | Chandy | |
| 2015/0298722 A1 | 10/2015 | Witte | |
| 2015/0298727 A1* | 10/2015 | Kimpara | B62D 5/0484 701/43 |
| 2015/0314804 A1 | 11/2015 | Aoki et al. | |
| 2017/0291635 A1 | 10/2017 | Yamasaki | |
| 2017/0349207 A1 | 12/2017 | Maeshima | |
| 2017/0361869 A1* | 12/2017 | Hales | H02P 6/04 |
| 2018/0281846 A1 | 10/2018 | Schreiner | |
| 2019/0126973 A1 | 5/2019 | Yamasaki | |
| 2019/0267926 A1* | 8/2019 | Tsubaki | B62D 5/0457 |
| 2020/0062301 A1* | 2/2020 | Farrelly | B62D 5/0409 |

FOREIGN PATENT DOCUMENTS

| | | |
|---|---|---|
| CN | 104755357 A | 7/2015 |
| CN | 104936850 A | 9/2015 |
| CN | 107005196 A | 8/2017 |
| DE | 10 2008 034 326 A1 | 2/2009 |
| DE | 10 2012 201 436 A | 4/2014 |
| DE | 10 2015 104 850 A | 10/2016 |
| DE | 102015116937 A1 | 4/2017 |
| DE | 11 2015 005 022 T | 7/2017 |
| DE | 10 2017 205 914 A | 10/2017 |
| EP | 2 778 021 A | 9/2014 |
| EP | 3 208 179 A | 8/2017 |

* cited by examiner

METHOD FOR PROVIDING STEERING ASSISTANCE FOR AN ELECTROMECHANICAL STEERING SYSTEM OF A MOTOR VEHICLE COMPRISING A REDUNDANTLY DESIGNED CONTROL DEVICE

CROSS REFERENCE TO RELATED APPLICATIONS

This application is a U.S. National Stage Entry of International Patent Application Serial Number PCT/EP2019/052988, filed Feb. 7, 2019, which claims priority to German Patent Application No. DE 10 2018 103 082.7, filed Feb. 12, 2018, the entire contents of both of which are incorporated herein by reference.

FIELD

The present disclosure generally relates to a method for providing steering assistance for an electromechanical steering system of a motor vehicle.

BACKGROUND

Currently available EPS systems are designed to be "fail-silent", i.e. if a malfunction is detected (either in the data processing system or the power electronics), the assistance of the power steering is switched off to avoid an undesirable condition, such as locking of the steering wheel. This approach is not suitable for autonomous or semi-autonomous driving. In an autonomous driving mode, the motor vehicle can use various sensors of the driver assistance system to detect the environment of the motor vehicle and can control the motor vehicle completely automatically by setting predetermined values. In a semi-autonomous driving mode, on the other hand, the driver assistance system steers automatically by specifying a predetermined steering angle. This is the case, for example, with a semi-autonomous parking process. In this case, the driver assistance system takes on the steering of the motor vehicle and the driver operates the accelerator pedal and the brake.

For autonomous driving, for example, the Automotive Safety Integrity Level (ASIL) quality criterion is required, which ensures a certain level of reliability or availability of the steering. In order to meet these higher safety requirements for semi-autonomous and autonomous driving, redundant concepts are proposed.

The disclosure document DE 10 2015 104 850 A1 discloses a redundant concept with a first partial drive with a first control electronics, a first intermediate circuit, a first power stage and a first winding group of a motor and a second partial drive with a second drive electronics, a second intermediate circuit, a second power amplifier and a second winding group of the motor, wherein there is a galvanic separation between the first and second control electronics, the first and second intermediate circuits, the first and second power amplifiers and the first and second winding groups. A galvanic separation ensures the greatest possible independence of the individual drives. This ensures that a defect cannot spread in several partial drives of a redundant drive and thus lead to a total failure of the functionality of the electrical steering system despite redundancy. Communication between the partial drives by means of a vehicle bus is costly.

EP 2 778 021 describes a method for generating and verifying an output command for use in a power steering system, wherein a primary and a secondary processing path are provided and the secondary processing path forms a fallback level. In the event that a fault is detected in the primary processing path, the secondary processing path takes on the processing and provision of the output command.

Thus, a need exists for a method for providing steering assistance for an electromechanical steering system of a motor vehicle with which the steering assistance can be ensured even in the event of a fault.

DETAILED DESCRIPTION

Figure 1:
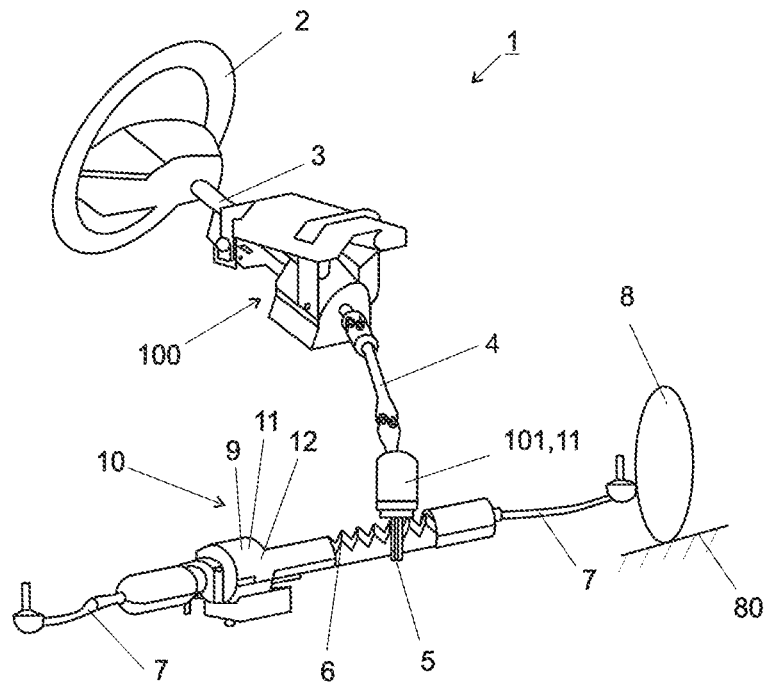
FIG. 1 is a schematic view of an electromechanical power steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a method for providing steering assistance for an electromechanical steering system of a motor vehicle with the features of the generic term of claim 1 and an electromechanical steering system for a motor vehicle having a control device which can execute the method.

Accordingly, a method of providing steering assistance for an electromechanical steering system of a motor vehicle is provided, wherein the steering system comprises a steering pinion connected to a lower steering shaft, which engages a rack movable in a housing along a longitudinal axis to steer wheels, at least two electric motors or one electric motor with at least two winding groups for steering assistance, a torque sensor arranged between an upper steering shaft connected to the steering wheel and the lower steering shaft, and an electronic control unit for calculation of the steering assistance. The electronic control unit has a redundant control device with a primary control path and a secondary control path. The primary control path has a primary computing unit, a primary gate driver module, and a primary performance module, and the secondary control path has a secondary computing unit, a secondary gate driver module, and a secondary performance module. The method includes the following steps:
  Detecting a steering torque applied by the driver using the torque sensor,
  In the fault-free case, calculating a primary and a secondary motor target torque in the primary computing unit as a function of the steering torque applied by the driver and other input variables, Transferring the primary motor target torque to a primary motor controller of the primary computing unit, Determining primary motor currents for operating a primary electric motor or a primary winding group of the electric motor in the primary motor controller, Transferring the secondary motor target torque from the primary computing unit by means of a signal line to a secondary motor controller of the secondary computing unit, Determining secondary motor currents for operating a secondary electric motor or a secondary winding group of the electric motor in the secondary motor controller of the secondary computing unit.

The redundant structure of the control device allows steering assistance even in the event that a hardware component of a control path fans or the software is faulty. The redundant control device can be kept cost-effective by the signal line between the computing units. The redundant concept achieves the safety required for highly automated and autonomous driving processes.

The terms "primary" and "secondary" do not mean that the modules are necessarily different or have a different priority or susceptibility to errors. They can be both equal and different.

Communication via the signal line is preferably performed via a Serial Peripheral Interface (SPI) or a Universal Asynchronous Receiver Transmitter (UART).

Preferably, the method has the following further steps:

Detecting a fault state in one of the control paths by the faulty control path,

Switching off the steering assistance of the faulty control path.

In a preferred embodiment, in a faulty state of one of the control paths, the faulty control path stops communication with the fault-free computing unit via the signal line, Based on the lack of communication, the fault-free control path detects the faulty state. This means that active monitoring of the states of the control paths can be dispensed with.

Advantageously, the method has further steps:

If the primary control path has a fault, switching off the steering assistance by the primary electric motor or the primary winding of the electric motor, Calculating the secondary motor target torque in the secondary computing unit as a function of the steering torque applied by the driver and other input variables, Transferring the secondary motor target torque to the secondary motor controller of the secondary computing unit, Determining the secondary motor currents for operating the secondary electric motor or a secondary winding group of the electric motor in the secondary motor controller of the secondary computing unit.

Only in this case does the secondary computing unit execute the steering algorithm to determine the target motor torque. It may be advantageous in particular for cost reasons if the primary computing unit is connected to a primary motor vehicle bus, wherein the secondary computing unit communicates with the motor vehicle via the primary motor vehicle bus by means of the signal line present between the primary and secondary computing units.

However, in order to increase redundancy, it is also possible that the primary control path is connected to a primary motor vehicle bus and the secondary control path is connected to a secondary motor vehicle bus which is separate from the primary motor vehicle bus.

Preferably, the further input variables include at least one of the following variables: vehicle speed, instantaneous rotor position measured by means of a rotor position sensor, measured current values in the phase windings.

To increase redundancy, the primary control path and the secondary control path can each have an integrated circuit connected to the power supply, which takes on the current monitoring of the corresponding computing unit, and a rotor position sensor.

Preferably, the primary control path and the secondary control path each have an external power supply.

It may be advantageous for cost reasons if the secondary computing unit is designed to be less powerful than the primary computing unit.

Preferably, the primary and secondary computing unit is an MCU. It can be advantageous if the integrated circuits are SBCs.

Furthermore, an electromechanical steering system for a motor vehicle is provided, having a steering pinion connected to a lower steering shaft and engaged with a rack movable in a housing along a longitudinal axis for steering wheels, at least one electric motor for steering assistance, a torque sensor which is arranged between an upper steering shaft connected to the steering wheel and the lower steering shaft and which detects a torque introduced by the driver, and an electronic control unit for the calculation of the steering assistance, which has a redundant control device designed to perform the method described above In FIG. 1, an electromechanical motor vehicle power steering system 1 with a steering wheel 2, which is rotationally fixedly coupled to an upper steering shaft 3, is shown schematically. By means of the steering wheel 2, the driver introduces a corresponding torque into the steering shaft 3 as a steering command. The torque is then transferred to a steering pinion 5 via the upper steering shaft 3 and the lower steering shaft 4. The pinion 5 engages a toothed segment of a rack 6 in a known way. The rack 6 is mounted in a steering housing to be movable in the direction of its longitudinal axis. At its free end, the rack 6 is connected to tie rods 7 via ball joints that are not shown. The tie rods 7 themselves are connected via axle journals, each to a steered wheel 8 of the motor vehicle in a known way. A rotation of the steering wheel 2 leads via the connection of the steering shaft 3 and the pinion 5 to a longitudinal shift of the rack 6 and thus to a pivoting of the steered wheels 8. The steered wheels 8 experience a reaction via a roadway 80, which counteracts the steering movement. A force is therefore required for the pivoting of the wheels 8, which requires a corresponding torque on the steering wheel 2. An electric motor 9 of a servo unit 10 is provided to assist the driver in this steering movement.

The upper steering shaft 3 and the lower steering shaft 4 are linked to each other torsionally flexibly by a torque rod that is not shown. A torque sensor unit 11 detects the rotation of the upper steering shaft 3 relative to the lower steering shaft 4 as a measure of the torque manually applied to the steering shaft 3 or the steering wheel 2. The servo unit 10 provides steering assistance for the driver as a function of the torque 111 measured by the torque sensor unit 11. The servo unit 10 can be coupled as an auxiliary force assistance device 10, 100, 101 either to a steering shaft 3, the steering pinion 5 or the rack 6. The respective auxiliary force assistance 10, 100, 101 introduces an auxiliary torque into the steering shaft 3, the steering pinion 5 and/or into the rack 6, whereby the driver is assisted with the steering work. The three different auxiliary force assistance devices 10, 100, 101 shown in FIG. 1 depict alternative positions for their arrangement. Usually, only one of the positions shown is occupied by an auxiliary force assistance device. The servo unit 10 has an electronic control unit 12 for the calculation of the steering assistance.

Figure 2:
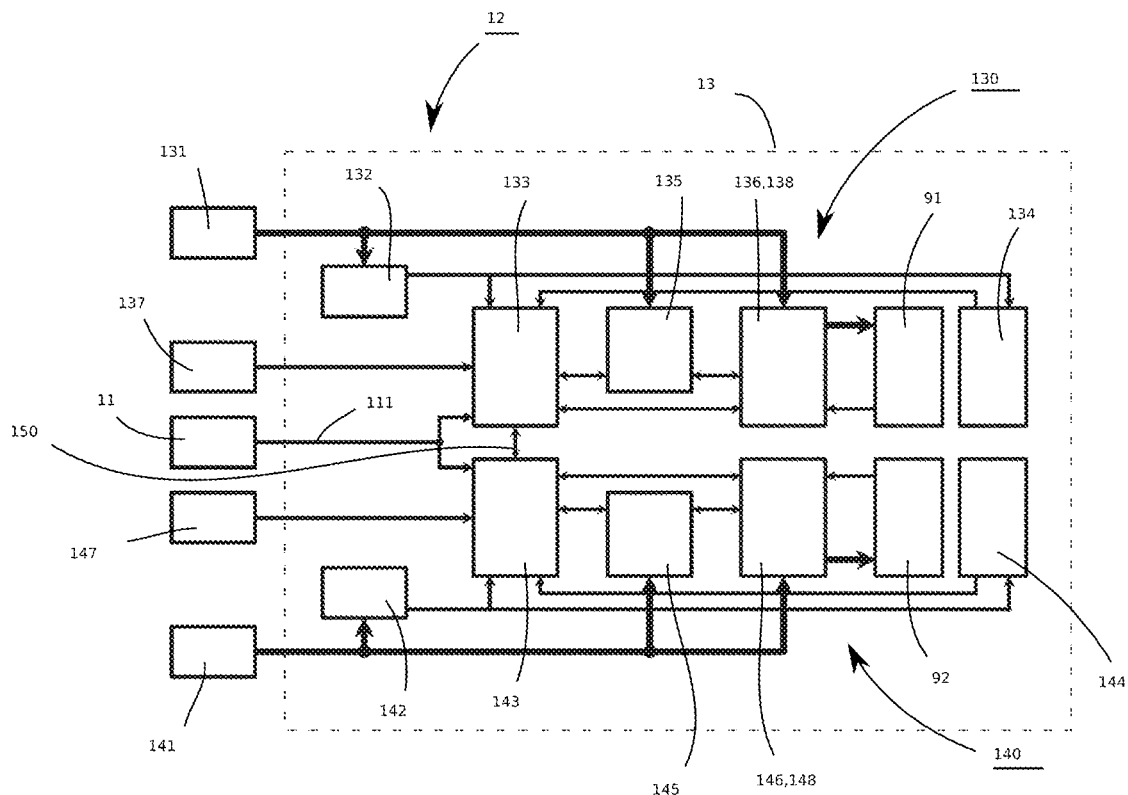
FIG. 2 is a block diagram of a control unit of the electromechanical power steering.

FIG. 2 shows a block diagram of the electronic control unit 12 of the electromechanical steering system. The control unit 12 comprises a control device (ECU) 13. The control device 13 is designed redundantly and has a primary control path 130 and a secondary control path 140. The primary control path 130 and the secondary control path 140 are constructed identically in the exemplary embodiment shown, i.e. each of the two control paths has a power supply, a computing unit, a power module, an electric motor and the necessary sensors (torque, phase current and rotor position). The modules of the primary control path are named below as "primary" modules and the modules of the secondary control path as "secondary" modules. The terms "primary" and "secondary" do not necessarily mean that there is a weighting between the modules. The modules can be both equal and different.

Each control path 130, 140 has an extern& power supply 131, 141, preferably a battery. An integrated circuit 132, 142 which is connected to the power supply 131, 141 takes on the current monitoring of a computing unit 133443 and a rotor position sensor (RPS) 134, 144. The primary and secondary computing unit 133, 143 is preferably a microcontroller (MCU). For example, the primary and secondary integrated circuit 132, 142 can be a System Basic Chip (SBC). The primary and secondary power supply 131, 141 also supplies a respective gate driver unit 135445 (CDU) and a power module 136, 146 of a control path 130, 140.

The primary and secondary computing units 133, 143 receive the torque 111 introduced by the driver into the steering wheel and measured by the torque sensor unit 11. Furthermore, the primary and secondary computing units 133, 143 are each connected to a separate motor vehicle bus 137, 147, via which the computing units receive 133443 data signals. The primary computing unit 133 calculates both target motor torques on the basis of the torque 111 introduced by the driver into the steering wheel and other input variables, such as the vehicle speed v sent via the respective motor vehicle bus 137, 147 and measurement signals from the electric motor, such as the instantaneous rotor position measured by means of the rotor position sensor 134, 144 and/or measured current values in the phase windings. The target motor torques are calculated by means of an algorithm, which, for example, is a so-called boost curve or a steering column torque control algorithm. The primary motor target torque is transferred to a primary motor controller 138 of the primary computing unit 133, which determines therefrom the primary motor currents by means of PWM. The secondary motor target torque is transferred via a signal line connecting the computing units 150 to a secondary motor controller 148 of the secondary computing unit 143, which determines therefrom the secondary motor currents by means of pulse width modulation (PWM). A primary motor 91 is energized with the primary motor currents and a secondary motor 92 is energized accordingly with the secondary motor currents, resulting in a common torque for assisting the steering movement of the driver. The primary and secondary motors 91, 92 are logically linked to each other. Two physically separated motors 91, 92 or a single motor 9 with two winding groups may be provided. In the event that one of the motors 91, 92 or one of the winding groups fails, half the nominal assistance torque is available.

Both control paths 130, 140 are each designed as "fail-silent", i.e. each control path can detect its own malfunction or fault condition and switch off the assistance by the associated motor or winding. This is typically achieved by a combination of an ASIL-D microcontroller with various plausibility tests and a hardware architecture capable of disconnecting the electric motor from the control device in the event of a fault (e.g. by phase relay).

Because the control paths 130, 140 are designed redundantly, the control device can provide auxiliary force assistance even if there is a malfunction of one of the hardware components. The two control paths 130, 140 are designed in such a way that i) the computing units can communicate with each other via the signal line 150 (for example by means of a Serial Peripheral Interface (SPI), a Universal Asynchronous Receiver Transmitter (UART), etc.), and (ii) the two control paths 130, 140 are at least mutually independent to the extent that a fault in a hardware component of one control path does not result in a fault cascade in a hardware component in the other control path, wherein the separation of the two control paths can be carried out, for example, by permanently assigned power lines and ground lines, isolation of control paths and the like. The software of the control paths 130, 140 is preferably designed so that faults in the hardware as well as in the software itself are detected within a control path and cause an interruption or shutdown of the steering assistance of the faulty control path.

In the fault-free state, both control paths 130, 140 can theoretically calculate the target motor torque by means of the measured torque and other measured values and can control the corresponding motor 91, 92, 9. "Fault-free" does not necessarily mean that there is no fault at all. For example, sensors are already redundantly designed in themselves, so that a fault in a sensor element does not lead to the failure of the entire sensor. "Fault-free" is therefore intended to mean that there is enough fault-free hardware to allow the control path to properly perform the calculations and the control of the motor.

In the fault-free state, the primary computing unit 133 takes on the calculation of the target motor torques. The secondary motor target torque is transferred via the signal line 150 to the secondary computing unit 143. The primary computing unit 133 and the secondary computing unit 143 then perform the motor control of the assigned motors. The driver and the power module control the motor. The secondary motor controller gives feedback about the torque applied by the secondary motor to the primary computing unit by means of the signal line 150.

Both control paths 130, 140 are each designed as "fail-silent", i.e. in the event of a fault, the steering assistance of the faulty control path 130, 140 is switched off and the faulty control path 130, 140 stops the communication with the fault-free control path 130, 140 via the signal line 150. Stopping communication allows the fault-free control path 130, 140 to detect the existence of a fault in the faulty control path 130, 140. Therefore, no active monitoring of the state of the control paths 130, 140 is performed. A failure of a control path 130, 140 occurs when there are not enough resources available to perform the necessary measurements, calculations, and control commands to control a motor. This can be, for example, a short circuit in a motor winding, a fault in a half bridge of a FET, a malfunction of the GDU or a malfunction of the computing unit and so on.

If there is a failure of the secondary control path 140, the steering assistance by the secondary motor 92 or the secondary winding group is switched off. This does not necessarily mean that the entire secondary control path 140, in particular the secondary computing unit 143 and/or the sensors, are no longer available. The primary control path 130 performs the calculation of the primary motor target torque and controls the primary motor 91 or the primary winding group. In this way, at least part of the auxiliary force assistance can be maintained. A change of the software of the primary control path 130 is not necessary for this.

If there is a failure of the primary control path 130, similarly the steering assistance by the primary motor 91 or the primary winding group is switched off. The secondary computing unit 143 takes on the calculation of the secondary motor target torque based on the torque 111 introduced by the driver into the steering wheel and further input variables and the secondary motor 92 or the secondary winding group is controlled accordingly by means of the secondary control path 140. For this purpose, a steering algorithm is started in the secondary computing unit 143 for the calculation of the secondary motor target torque.

If the control device is already in one of the two fault states described above and another fault is detected in the previously fault-free control path, this will lead to the shutdown of the entire steering force assistance.

It may be advantageous to design the CPUs of the two microcontrollers 133, 143 differently to save costs. The data processing resources of the secondary computing unit 133 may be lower than that of the primary control path, because if a fault in the primary control path causes the primary control path to fail, the control device is already in a restricted operating mode and it is likely that only half of the nominal assistance torque is still available. In this case, the semi-autonomous driving mode can no longer be guaranteed, so that the secondary microcontroller, which takes on the calculation of the target motor torque, can be significantly less powerful and thus more cost-effective.

Furthermore, the motor vehicle bus of the secondary control path can be dispensed with for cost reasons. This is useful in the event that (i) the control unit only has permission to communicate with the vehicle if there are no faults or (ii) the primary communication bus is already designed redundantly.

For cost reasons, it may also be provided to dispense with a redundant power supply. This is useful if the power supply failure rate is acceptable or the vehicle cannot guarantee a redundant power supply. Both control paths are connected to a common power connection in this case.

The invention is generally scalable to any number of control paths. The previously described presence of two paths is just one example.

What is claimed is:

1. A method for providing steering assistance for an electromechanical steering system of a motor vehicle having a steering pinion connected to a lower steering shaft, which engages a rack mounted in a housing to be movable along a longitudinal axis for steering wheels, at least two electric motors or one electric motor with at least two winding groups for steering assistance, a torque sensor arranged between an upper steering shaft connected to the steering wheel and the lower steering shaft, and an electronic control unit for calculating the steering assistance, wherein the electronic control unit comprises a redundant control device with a primary control path and a secondary control path, wherein the primary control path has a primary computing unit, a primary gate driver module and a primary power module, and the secondary control path has a secondary computing unit, a secondary gate driver module, and a secondary power module, the secondary computing unit is configured to be less powerful than the primary computing unit the method comprising:

detecting an applied steering torque with the torque sensor, when in a fault-free case, calculating a primary motor target torque and a secondary motor target torque in the primary computing unit as a function of at least the applied steering torque, transferring the primary motor target torque to a primary motor controller of the primary computing unit, determining primary motor currents for operating a primary electric motor or a primary winding group of the electric motor in the primary motor controller, transferring the secondary motor target torque from the primary computing unit by means of a signal line to a secondary motor controller of the secondary computing unit, and determining secondary motor currents for the operation of a secondary electric motor or a secondary winding group of the electric motor in the secondary motor controller of the secondary computing unit.

2. The method of claim 1, further comprising:
detecting a fault state in one of the control paths, and
switching off the steering assistance of the faulty control path.

3. The method of claim 2 wherein when one of the control paths is in a fault state, the faulty control path stops the communication with the fault-free computing unit over the signal line and the fault-free control path detects the fault state on the basis of the missing communication.

4. The method of claim 1, further comprising:
switching off, when the primary control path has a fault, the steering assistance by the primary electric motor or the primary winding of the electric motor,
calculating the secondary motor target torque in the secondary computing unit as a function of the applied steering torque,
transferring the secondary motor target torque to the secondary motor controller of the secondary computing unit, and
determining the secondary motor currents for operating the secondary electric motor or a secondary winding group of the electric motor in the secondary motor controller of the secondary computing unit.

5. The method of claim 1 wherein the primary computing unit is connected to a primary motor vehicle bus, wherein the secondary computing unit communicates with the motor vehicle via the primary motor vehicle bus by means of the signal line present between the primary and secondary computing units.

6. The method of claim 1 wherein the primary control path is connected to a primary motor vehicle bus and the secondary control path is connected to a secondary motor vehicle bus which is separated from the primary motor vehicle bus.

7. The method of claim 1 comprising at least one further input variable selected from vehicle speed, instantaneous rotor position measured by means of a rotor position sensor, or measured current values in the phase windings.

8. The method of claim 1 wherein the primary control path and the secondary control path each have an integrated circuit connected to the power supply, which takes on the current monitoring of the corresponding computing unit and a rotor position sensor.

9. The method of claim 1 wherein each of the primary control path and the secondary control path has an external power supply.

10. The method of claim 1 wherein the primary and secondary computing unit is a microcontroller.

11. The method of claim 1 wherein the integrated circuits are System Basic Chips.

12. An electromechanical steering system for a motor vehicle, comprising:
- a steering pinion connected to a lower steering shaft, which engages a rack for steering wheels which is mounted in a housing so as to be movable along a longitudinal axis,
- at least one electric motor configured to generate steering assistance,
- a torque sensor disposed between an upper steering shaft connected to a steering wheel and the lower steering shaft and which detects a user-applied torque, and
- an electronic control unit for calculating the steering assistance, which has a redundant control device configured to perform the method of claim 1.

* * * * *